March 20, 1928.
J. J. PETERSON
1,663,059
CLEANING AND ABRASIVE DEVICE
Filed Dec. 30, 1922
2 Sheets-Sheet 1
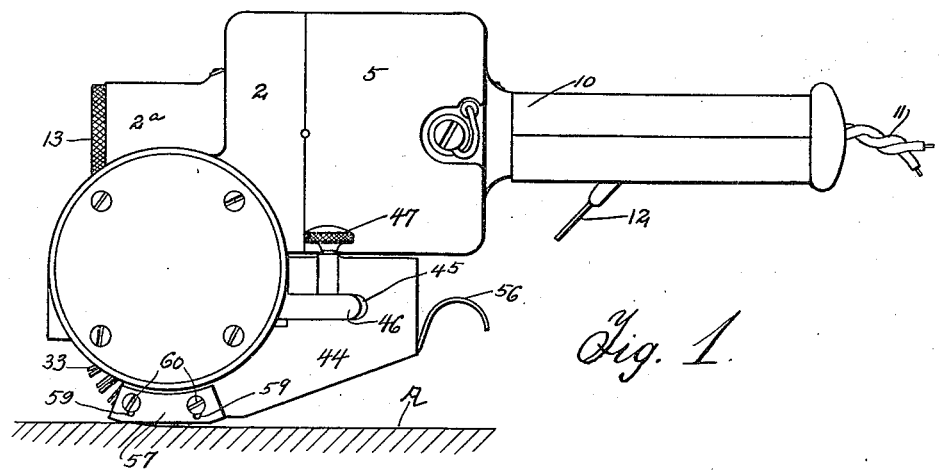
Fig. 1.
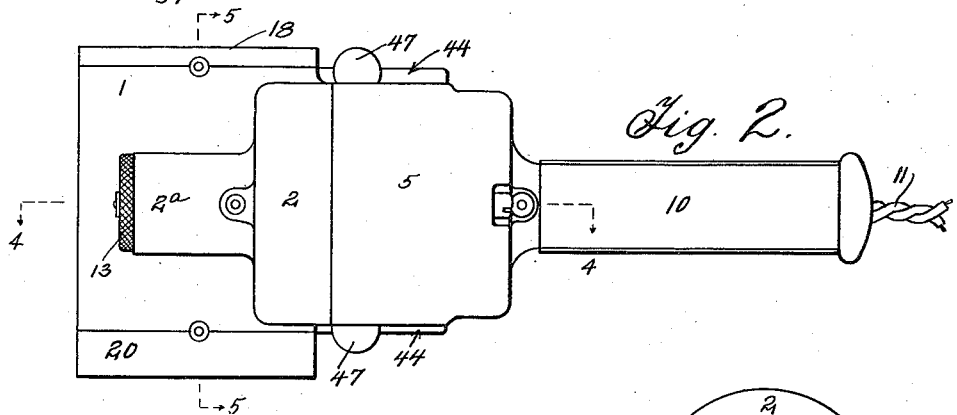
Fig. 2.
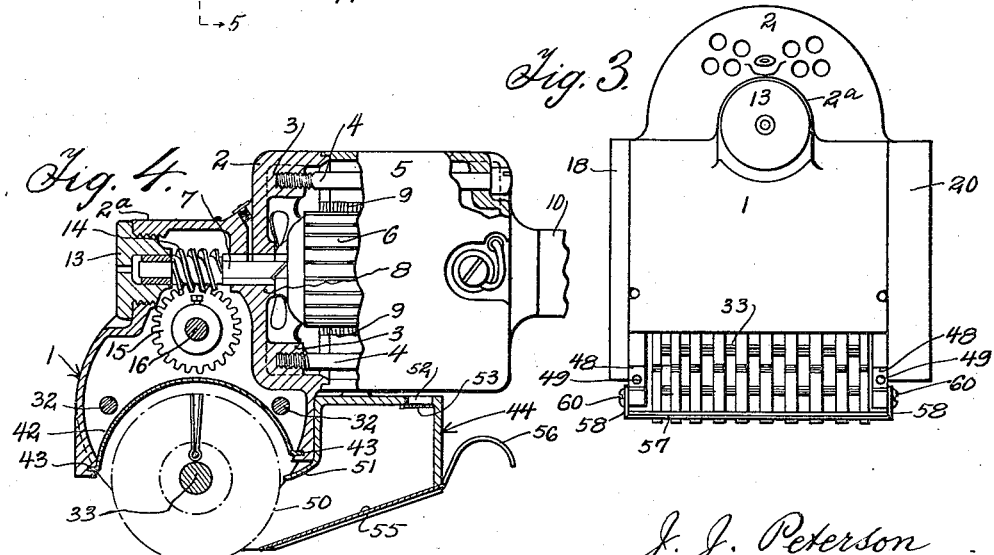
Fig. 3.
Fig. 4.
J. J. Peterson
INVENTOR
BY Victor J. Evans
ATTORNEY March 20, 1928.

J. J. PETERSON 1,663,059

CLEANING AND ABRASIVE DEVICE

Filed Dec. 30, 1922  2 Sheets-Sheet 2

J. J. Peterson
INVENTOR

BY Victor J. Evans
ATTORNEY

Patented Mar. 20, 1928.

1,663,059

UNITED STATES PATENT OFFICE.

JOHN J. PETERSON, OF STEUBENVILLE, OHIO.

CLEANING AND ABRASIVE DEVICE.

Application filed December 30, 1922. Serial No. 609,923.

This invention relates to cleaning devices, and more particularly to what I term a cleaning and abrasive device.

One of the main objects of the invention is to provide a machine of simple construction and operation which may be used for cleaning meat blocks, windows, and other surfaces. A further object is to provide a machine of this character in which the cleaning member may be readily removed and replaced. A further object is to provide a cleaning member of simple and efficient construction which may be produced at comparatively small cost. Further objects will appear from the detailed description.

In the drawings:—

Figure 1 is a side view of the machine;

Figure 2 is a top plan view;

Figure 3 is a front view;

Figure 4 is a section, partly in elevation, taken substantially on line 4—4 of Fig. 2;

Figure 5:
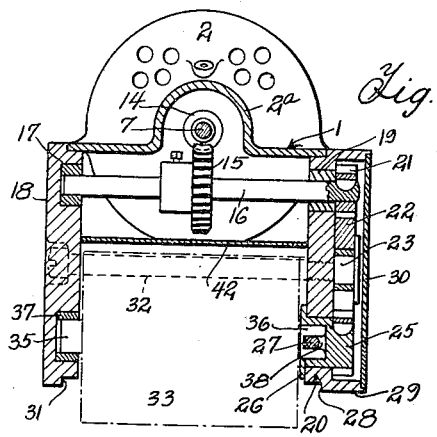
Figure 5 is a section taken on line 5—5 of Fig. 2.
Figure 6:
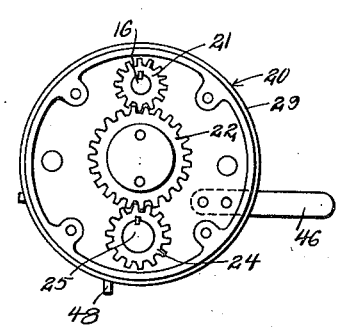
Figure 6 is an end view of the gear casing, the cover being removed.
Figure 7:
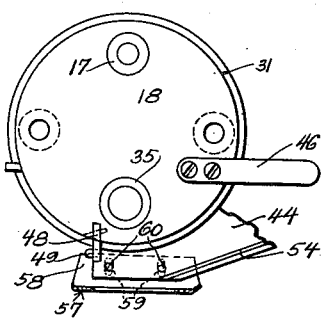
Figure 7 is an inside face view of the removable head for the casing and associated parts.
Figure 8:
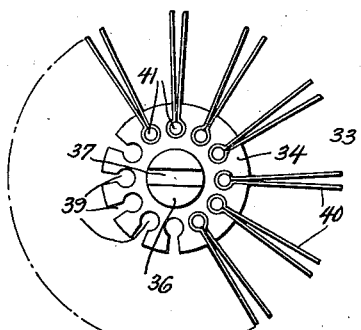
Figure 8 is an end view of the cleaning member.
Figure 9:
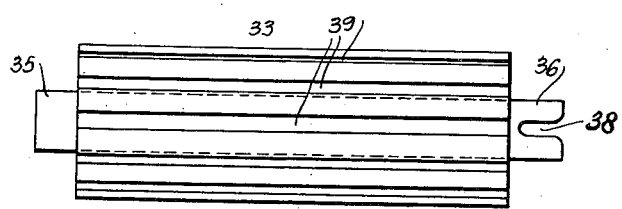
Figure 9 is a front view of the cleaning member the bristle elements being omitted.

In constructing the machine I provide a cylindrical main casing 1 which is formed integrally with a supplemental casing 2 provided at the rear upper portion of casing 1. Casing 2 is provided with bosses 3 which are bored and threaded to receive lag screws 4 which serve to detachably secure a motor casing 5 to supplemental casing 2. An electric motor 6 of a known type is enclosed by casing 5, the field coils of the motor being mounted in the casing and the armature being mounted on an armature shaft 7 which is rotatably mounted through a bearing sleeve 8 at the inner end of supplemental casing 2. A fan 9 is secured on armature shaft 7 and acts to cool the motor. The other end of shaft 7 is seated in a bearing ring secured in the inner end of a handle element 10 projecting rearwardly from motor casing 5. By unthreading screws 4 from bosses 3 casing 5 and the parts associated therewith may be detached from supplemental casing 2. A cord 11 passes through handle 10 and provides means for connecting the motor to a suitable source of electrical energy. A control switch, of a known type, is mounted in handle 10 and is operated by a lever 12 which projects beneath the handle. The forward end of armature shaft 7 is seated in a plug 13 which threads into the forward end of a cylindrical extension $2^a$ of supplemental casing 2.

A worm 14 is secured on armature shaft 7 and meshes with a worm wheel 15 secured on a counter shaft 16 rotatably mounted in the upper portion of casing 1. This counter shaft is seated, at one end, in a bearing ring 17 secured in head 18 at one end of the casing. Shaft 16 passes through a similar bearing ring 19 secured in end head 20, and a pinion 21 is secured on the shaft and meshes with an idler gear 22 mounted on a stub-shaft 23 projecting from the outer face of head 20. Gear 22 meshes with a pinion 24 keyed on a stub-shaft 25 rotatably mounted through head 20. This stub-shaft is provided, at its inner end, with an annular shoulder 26 which contacts with the inner face of head 20, pinion 24 and shoulder 26 coacting to hold the stub-shaft against movement through the head. Stub-shaft 25 is bored out from its inner end to form a cylindrical recess and a pin 27 is secured through shaft 25 and extends transversely of this recess. Head 20 is provided with an outer annular shoulder 28 from which extends an annular collar 29 forming a casing which extends about the gear 22 and pinions 21 and 24. A cover plate 30 is secured in the outer end of collar 29 the gear and pinions being thus completely enclosed so as to be protected from dust, grit, and other foreign materials. Head 18 is also provided with an outer annular shoulder 31. The heads are detachably secured together and forced toward each other by stay screws 32 which pass through head 18 and are threaded into head 20, head 18 being preferably, though not necessarily, provided with recesses for reception of the heads of the screws. The screws serve to force the heads toward each other into tight contact with the ends of casing 1 and to detachably connect the heads.

A cleaning member 33 is mounted within the lower portion of casing 1 and projects below the casing. This member includes a cylindrical body 34 provided at its ends with bearing gudgeons 35 and 36. Gudgeon 35 is seated in a bearing ring 37 secured in head 18 and gudgeon 36 is seated in the recess provided in the inner portion of stub-shaft 25. Gudgeon 36 is provided with a diametrically extending slot 38 which receives pin 27 thus connecting member 33 to stub-shaft 25 for rotation therewith. With the cleaning member 33 mounted in the manner illustrated and described, this member can be rotated within casing 1 and, by unscrewing stay screws 32 from head 20 and removing head 18 the cleaning member can be bodily removed from the machine and replaced by a cleaning member of a different type. This provides simple and efficient means whereby the machine can be readily adapted for a variety of uses.

Cylindrical body 34 of member 33 is provided with a plurality of longitudinally extending and outwardly opening key-hole slots 39. These slots receive bristle members 40 of suitable type which are inserted into the slots and are secured by means of rods 41 inserted through the slots and through the inner end portions of members 40 which are formed of loops of the material constituting the bristle members. In the particular form illustrated the members 40 are formed of flat resilient pieces of steel thus providing an abrasive device which is well adapted for cleaning meat blocks and similar surfaces. The member 33 is rotated at comparatively high speed and the members 40 serve to effectually scrape the block and remove foreign materials therefrom. A variety of cleaning members or rollers may be used in the machine so that it may be used for any purpose desired, the proper roller or brush being readily inserted in the manner previously described.

A shield 42 extends about the upper portion of cleaning member 33. This shield is provided with front and back outwardly projecting flanges 43 which fit into corresponding grooves provided in the inner faces of the front and back walls of casing 1. The shield is confined between the end heads of the casing and by removing the head 18 in the manner described the shield 42 can be removed from the casing when this becomes necessary or desirable. A dirt receiving pan 44 is mounted in rear of member 33. This pan is provided in each end with a groove 45 which receives an arm 46 which is secured in and projects rearwardly from the adjacent end head of casing 1. Set screws 47 are threaded through the upper portion of each end of the pan and contact with arms 46 for detachably securing the pan in operative position. A finger 48 is secured in and depends from the lower portion of each end head of the casing. This finger is provided with an opening which receives a pin 49 projecting from the forward end of the end wall of pan 44, the fingers 48 and pins 49 co-operating to insure proper positioning of the pan. When the pan is in operative position it fits snugly against the rearward portion of casing 1 and the forward end of the pan is positioned closely adjacent to member 33, the pan being open at its forward end to provide a throat 50 for discharge of materials from member 33 into the pan. The forward upper wall 51 of pan 44 is curved downwardly and forwardly and extends to within a short distance of the periphery of member 33 thus providing a baffle which effectually prevents any materials being drawn out of pan 44 by the rotation of member 33. The pan is further provided with an opening 52 through its top wall closed by a screen 53 of fine mesh which permits escape of air from pan 44. Each end wall of pan 44 is provided, adjacent to its lower edge, with a groove 54. These grooves receive a closure plate 55 provided at the center of its rearward end with a gripping element 56. By removing this plate the contents of pan 44 can be readily discharged.

A rectangular frame 57 is provided at the forward end of pan 44. This frame is provided, at each end, with an upwardly projecting flange 58 provided with two vertically disposed slots 59 which receive set screws 60 which are threaded into the end of pan 44. When frame 57 is in position the bristle members 40 of member 33 projecting through this frame which provides a support or bearing for moving the machine over the meat block A or other surface to be cleaned, as illustrated in Fig. 1. By adjusting frame 57 toward or away from casing 1 the extent to which the bristle members 40 project through the frame may be varied to suit conditions. This provides very simple and efficient means whereby the depth to which the bristle members 40 act can be accurately regulated so as to insure proper operation of the machine. By replacing the abrasive member 33 by a suitable brush or roller the machine can be used for cleaning window panes and other surfaces, for which purpose it has been found to be very efficient.

What I claim is:—

In a machine of the character described, a casing, heads fitting into the casing at the ends thereof and each provided with a peripheral flange abutting the end of said casing, a cleaning member mounted in the casing and provided with a bearing element at each end, the heads being provided with recesses for reception of said bearing elements, means for detachably securing the heads together, a supplemental casing integral with the main casing, a motor casing detachably secured to said supplemental casing and provided with a rearwardly projecting handle element, a motor in the motor casing, and driving connections between the motor and said cleaning member, said connections permitting bodily removal of the cleaning member when the heads are detached.

In testimony whereof I affix my signature.

JOHN J. PETERSON.